US011908611B2

(12) United States Patent
Shoda et al.

(10) Patent No.: US 11,908,611 B2
(45) Date of Patent: Feb. 20, 2024

(54) MANUFACTURING METHOD FOR SURFACE MOUNTED INDUCTOR

(71) Applicant: Murata Manufacturing Co., Ltd., Kyoto-fu (JP)

(72) Inventors: Yoshitoshi Shoda, Tsurugashima (JP); Kozo Sato, Tsurugashima (JP); Makoto Murakami, Tsurugashima (JP); Kunio Sasamori, Tsurugashima (JP); Naoto Takahashi, Tsurugashima (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 750 days.

(21) Appl. No.: 17/074,168

(22) Filed: Oct. 19, 2020

(65) Prior Publication Data

US 2021/0035731 A1 Feb. 4, 2021

Related U.S. Application Data

(60) Division of application No. 15/407,727, filed on Jan. 17, 2017, now Pat. No. 10,847,309, which is a (Continued)

(30) Foreign Application Priority Data

Jul. 18, 2014 (JP) ................................ 2014-147486

(51) Int. Cl.
*H01F 27/29* (2006.01)
*H01F 17/04* (2006.01)
(Continued)

(52) U.S. Cl.
CPC ........... *H01F 27/292* (2013.01); *H01F 17/04* (2013.01); *H01F 27/2828* (2013.01);
(Continued)

(58) Field of Classification Search
CPC .. H01F 27/292; H01F 2017/048; H01F 17/04; H01F 41/076; H01F 41/04;
(Continued)

(56) References Cited

U.S. PATENT DOCUMENTS 6,114,936 A 9/2000 Yamamoto et al.
9,305,702 B2 * 4/2016 Sasamori .............. H01F 27/292
(Continued)

FOREIGN PATENT DOCUMENTS

CN 101086916 A 12/2007
CN 103295754 A 9/2013
(Continued)

OTHER PUBLICATIONS

An Office Action; "Notification of Preliminary Rejection," issued by the Korean Intellectual Property Office dated Nov. 20, 2017, which corresponds to Korean Patent Application No. 10-2017-7001313 and is related to U.S. Appl. No. 15/407,727.
(Continued)

*Primary Examiner* — Thiem D Phan
(74) *Attorney, Agent, or Firm* — Studebaker & Brackett PC

(57) ABSTRACT

A formed body incorporating a coil by using: a coil formed by winding a conductive wire, and a formed body incorporating the coil, the formed body being formed with a sealing material containing a resin and a magnetic material. The coil is formed by winding the conductive wire so that lead-out ends are positioned at an outer periphery of a wound portion. The formed body is formed so that surfaces of the coil are partially exposed on four side surfaces of the formed body which are parallel to a winding axis of the coil, and the area of a portion of the formed body outside the outer periphery of the wound portion is almost equal to or smaller than the
(Continued)

area of a portion of the formed body inside an inner periphery of the wound portion of the coil.

2 Claims, 5 Drawing Sheets

Related U.S. Application Data continuation of application No. PCT/JP2015/069526, filed on Jul. 7, 2015.

(51) Int. Cl.

| | |
|---|---|
| ***H01F 41/076*** | (2016.01) |
| ***H01F 27/28*** | (2006.01) |
| ***H01F 41/02*** | (2006.01) |

(52) U.S. Cl.
CPC ....... *H01F 41/0246* (2013.01); *H01F 41/076* (2016.01); *H01F 2017/048* (2013.01); *Y10T 29/4902* (2015.01)

(58) Field of Classification Search
CPC ................. H01F 27/28; Y10T 29/4902; Y10T 29/49071; Y10T 29/49073
USPC .............. 29/602.1, 603.23, 603.26, 604, 606
See application file for complete search history.

(56) References Cited

U.S. PATENT DOCUMENTS

| | | | |
|---|---|---|---|
| 2010/0259353 A1 | 10/2010 | Saito et al. | |
| 2014/0062643 A1 | 3/2014 | Hahn et al. | |
| 2014/0366365 A1* | 12/2014 | Sasamori | H01F 41/0246 29/605 |

FOREIGN PATENT DOCUMENTS

| | | |
|---|---|---|
| JP | 2007-305665 A | 11/2007 |
| JP | 2010-245473 A | 10/2010 |
| JP | 2010-283119 A | 12/2010 |
| JP | 2014-049597 A | 3/2014 |
| WO | 2012/105489 A1 | 8/2012 |

OTHER PUBLICATIONS

Notification of the First Office Action issued by the State Intellectual Property Office of the People's Republic of China dated Oct. 20, 2017, which corresponds to Chinese Patent Application No. 10-2017-7001313 and is related to U.S. Appl. No. 15/407,727.

International Search Report issued in PCT/JP2015/069526; dated Sep. 8, 2015.

Written Opinion issued in PCT/JP2015/069526; dated Sep. 8, 2015.

* cited by examiner

--Prior Art--

--Prior Art--

--Prior Art--

MANUFACTURING METHOD FOR SURFACE MOUNTED INDUCTOR

CROSS-REFERENCE TO RELATED APPLICATIONS

This application is a Divisional of U.S. patent application Ser. No. 15/407,727 filed Jan. 17, 2017, which claims benefit of priority to Japanese Patent Application 2014-147486 filed Jul. 18, 2014, and to International Patent Application No. PCT/JP2015/069526 filed Jul. 7, 2015, the entire content of which is incorporated herein by reference.

TECHNICAL FIELD

The present disclosure relates to a surface mounted inductor having a coil formed by winding a conductive wire, and a formed body incorporating the coil, the formed body being formed with a sealing material containing a resin and a magnetic material, and a manufacturing method therefor.

BACKGROUND

In a conventional surface mounted inductor, as shown in FIG. 8, a conductive wire is wound to form a coil 21. The coil 21 is embedded in a formed body 27 formed with a sealing material containing magnetic powder and a resin, and the coil 21 is connected to external terminals 28 formed on surfaces of the formed body 27 (for example, refer to JP 2010-245473 A). In this surface mounted inductor, as shown in FIG. 9, the coil 21 formed by winding the conductive wire is placed on a tablet 22. As shown in FIG. 10, the coil and the tablet are arranged in a molding die so that a lead-out end 21*b* of the coil 21, which is placed along an outer side surface of a pillar-shaped convex portion 22*a* of the tablet 22, is interposed between the outer side surface of the pillar-shaped convex portion 22*a* and an inner wall surface of a molding die 24. Then, using this molding die, a formed body 27 incorporating the coil 21 is formed by a compression molding method or a powder compacting method.

In such a conventional surface mounted inductor, since the coil is embedded in the formed body formed with the sealing material containing the magnetic material, the whole coil is coated with the magnetic material, so that flux leakage can be reduced.

In this type of surface mounted inductor, miniaturization is desired, and furthermore, in applications not for high-density mounting, superimposed current values Idc and resistance values Rdc are emphasized rather than flux leakage, so that those having a high superimposed current value Idc and a low resistance value Rdc are desired.

However, in such a conventional surface mounted inductor, since the formed body incorporating the coil is formed by the compression molding method or the powder compacting method in a state in which the lead-out end of the coil is interposed between the pillar-shaped convex portion of the tablet and the inner wall surface of the molding die, the shape of the tablet becomes complicated, and the size of the coil cannot be increased, necessitating the reduction in the area of a winding axis section of the coil or in the cross-sectional area of the conductive wire, and deterioration of the superimposed value Idc and the resistance value Rdc.

SUMMARY

One or more embodiments of the present disclosure are to provide a surface mounted inductor which can improve the superimposed value Idc or the resistance value Rdc, and can be inexpensively manufactured, and a manufacturing method therefor.

One or more embodiments of the present disclosure provide a surface mounted inductor comprising a coil formed by winding a conductive wire, and a formed body incorporating the coil, the formed body being formed with a sealing material containing a resin and a magnetic material, wherein the coil is formed by winding the conductive wire so that lead-out ends are positioned at an outer periphery of a wound portion, the formed body is formed so that surfaces of the coil are partially exposed on four side surfaces of the formed body which are parallel to a winding axis of the coil, and that the area of a portion of the formed body outside the outer periphery of the wound portion is almost equal to or smaller than the area of a portion of the formed body inside an inner periphery of the wound portion of the coil.

One or more embodiments of the present disclosure provide a manufacturing method for a surface mounted inductor comprising a coil formed by winding a conductive wire, and a formed body incorporating the coil, the formed body being formed with a sealing material containing a resin and a magnetic material, the method comprising the steps of:

forming a coil by winding a conductive wire so that lead-out ends are positioned at an outer periphery of a wound portion;

forming a formed body by placing the coil between a pair of plate-shaped tablets which are formed with the sealing material, and integrating them by a compression molding method so that the coil is partially exposed on four side surfaces of the formed body which are parallel to a winding axis of the coil, and that the area of a portion of the formed body outside the outer periphery of the wound portion of the coil is almost the same as or smaller than the area of a portion of the formed body inside an inner periphery of the wound portion of the coil; and forming external terminals connected to the lead-out ends of the coil on surfaces of the formed body.

One or more embodiments of the present disclosure provide a surface mounted inductor comprising a coil formed by winding a conductive wire, and a formed body incorporating the coil, the formed body being formed with a sealing material containing a resin and a magnetic material, wherein the coil is formed by winding the conductive wire so that lead-out ends are positioned at an outer periphery of a wound portion, the formed body is formed so that surfaces of the coil are partially exposed on four side surfaces of the formed body which are parallel to a winding axis of the coil, and that the area of a portion of the formed body outside the outer periphery of the wound portion is almost equal to or smaller than the area of a portion of the formed body inside an inner periphery of the wound portion of the coil. Therefore, the size of the coil incorporated into the formed body can be increased, and the superimposed current value Idc and the resistance value Rdc can be improved. Furthermore, the structure of the tablet for forming the formed body can be simplified, and the tablet can be easily fabricated.

One or more embodiments of the present disclosure provide a manufacturing method for a surface mounted inductor comprising a coil formed by winding a conductive wire, and a formed body incorporating the coil, the formed body being formed with a sealing material containing a resin and a magnetic material, the method comprising the steps of:

forming a coil by winding a conductive wire so that lead-out ends are positioned at an outer periphery of a wound portion;

forming a formed body by placing the coil between a pair of plate-shaped tablets which are formed with the sealing material, and integrating them by a compression molding method so that the coil is partially exposed on four side surfaces of the formed body which are parallel to a winding axis of the coil, and that the area of a portion of the formed body outside the outer periphery of the wound portion of the coil is almost the same as or smaller than the area of a portion of the formed body inside an inner periphery of the wound portion of the coil; and forming external terminals connected to the lead-out ends of the coil on surfaces of the formed body. Therefore, the size of the coil incorporated into the formed body can be increased without complicating the manufacturing process, and the superimposed current value Idc and the resistance value Rdc can be improved. Furthermore, the structure of the tablet can be simplified, and the tablet can be easily fabricated.

DETAILED DESCRIPTION

One or more embodiments of the present disclosure include a coil formed by winding a conductive wire, and a formed body incorporating the coil, the formed body being formed with a sealing material containing a resin and a magnetic material. The coil has a wound portion obtained by winding the conductive wire so that both of its ends are positioned at an outer periphery, and lead-out ends led out from the outer periphery of the wound portion. The formed body is formed so that surfaces of the coil are partially exposed on four side surfaces of the formed body which are parallel to a winding axis of the coil, and that the area of a portion of the formed body outside the outer periphery of the wound portion is almost equal to or smaller than the area of a portion of the formed body inside an inner periphery of the wound portion of the coil. Therefore, in one or more embodiments of the present disclosure, since the size of the outer shape of the coil can be maximized within the range of the size of the outer shape of the formed body, a dead space in the formed body can be reduced, and the diameter of the winding axis section of the coil or the cross-sectional area of the conductive wire can be increased.

In one or more embodiments of the present disclosure, first, a coil is formed by winding a conductive wire so that lead-out ends are positioned at an outer periphery of a wound portion of the coil. Next, the coil is placed between a pair of plate-shaped tablets which are formed with a sealing material and formed to have almost the same size as that of the outer periphery of the coil. They are integrated by the compression molding method to form a formed body so that the coil is partially exposed on four side surfaces of the formed body which are parallel to the winding axis of the coil, and that the area of a portion of the formed body outside the outer periphery of the wound portion of the coil is almost the same as or smaller than the area of a portion of the formed body inside an inner periphery of the wound portion of the coil. Lastly, external terminals connected to the lead-out ends of the coil on surfaces of the formed body are formed. Therefore, in the manufacturing method for a surface mounted inductor of the present disclosure, since the size of the outer shape of the coil can be maximized within the range of the size of the outer shape of the formed body, a dead space in the formed body can be reduced, and the diameter of the winding axis section of the coil or the cross-sectional area of the conductive wire can be increased.

The best mode for carrying out the present disclosure will hereinafter be described with reference to FIG. 1 through FIG. 7.

Figure 1:
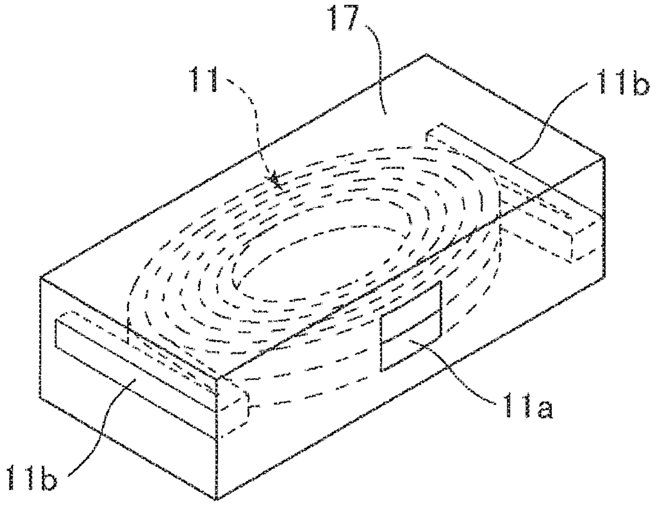
FIG. 1 is a perspective view showing the inside of a formed body of an embodiment of a surface mounted inductor according to the present disclosure when it is seen in a see-through state.
Figure 2:
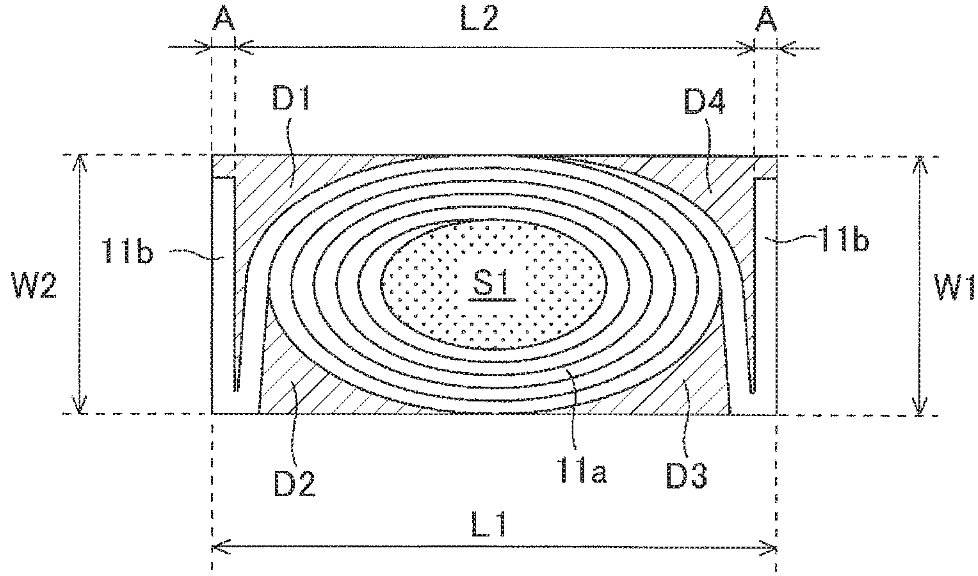
FIG. 2 is a cross-sectional view showing the inside of the formed body of the embodiment of the surface mounted inductor according to the present disclosure when it is seen in a see-through state.

FIG. 1 is a perspective view showing the inside of a formed body of an embodiment of a surface mounted inductor according to the present disclosure when it is seen in a see-through state, and FIG. 2 is a cross-sectional view showing the inside of the formed body of the embodiment of the surface mounted inductor according to the present disclosure when it is seen in a see-through state.

In FIG. 1, and FIG. 2, the reference numeral 11 denotes a coil, and the reference numeral 17 denotes a formed body.

The coil 11 is an air core coil, the coil 11 includes a wound portion 11*a* obtained by spirally winding a conductive wire in two-tiers in an outside-to-outside manner so that both of its ends are positioned at an outer periphery, and lead-out ends 11*b* led out from the wound portion 11*a*. As the conductive wire, a rectangular wire that is rectangular in cross section is used. The wound portion 11*a* is formed in an elliptical shape. Further, the lead-out ends 11*b* are formed by being led out from the wound portion 11*a* so as to be opposite to each other across the wound portion 11*a*, and by bending each lead-out end 11*b* in a direction opposite to the direction from which it is led out.

Figure 3:
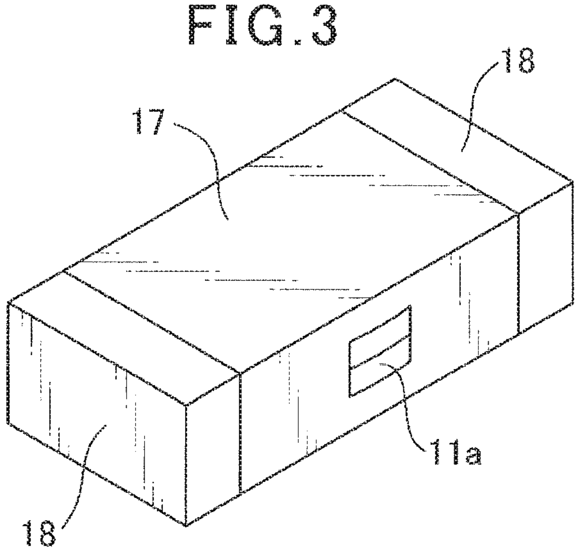
FIG. 3 is a perspective view showing the embodiment of the surface mounted inductor according to the present disclosure.

A formed body 17 is formed with a sealing material containing a resin and a magnetic material so as to incorporate the coil 11. As the sealing material, using as the magnetic material iron-based metal magnetic powder, for example, and using as the resin an epoxy resin, for example, those obtained by mixing them are used. The formed body 17 is formed so that a size W1 in a width direction is almost equal to an outer peripheral size W2 in a minor axis direction of the wound portion 11*a* of the coil 11. Also, the formed body 17 is formed so that a size L1 in a length direction is almost equal to or a little larger than a size obtained by adding an outer peripheral size L2 in a major axis direction of the wound portion 11*a* of the coil 11, a thickness A of one lead-out end 11*b*, and a thickness A of the other lead-out end 11*b*. On side surfaces opposed in the width direction of the formed body 17, surfaces in the minor axis direction of the wound portion 11*a* of the coil 11 are partially exposed. On side surfaces opposed in the length direction of the formed body 17, surfaces of the lead-out ends 11*b* of the coil 11 are exposed. At this time, the formed body 17 is formed so that the total area of portions D1, D2, D3 and D4 outside the outer periphery of the wound portion 11*a* of the coil 11 is almost the same as or smaller than the area of a portion S1 inside an inner periphery of the wound portion 11*a* of the coil 11. As shown in FIG. 3, a pair of external terminals 18 are formed on surfaces of this formed body 17.

The lead-out ends 11*b* which are respectively exposed on the side surfaces opposed in the length direction of the formed body 17 are connected to the external terminals 18, so that the coil is connected between the pair of external terminals 18.

Such a surface mount inductor is manufactured as follows. First, a conductive wire which is rectangular in cross section and provided with insulation coating is spirally wound in two-tiers in an outside-to-outside manner so that both of its ends are positioned at an outer periphery thus forming a wound portion. Thereafter, both the ends of the conductive wire are led out from the outer periphery of the wound portion, and further subjected to bending to form lead-out ends, thus forming an air core coil.

Figure 4:
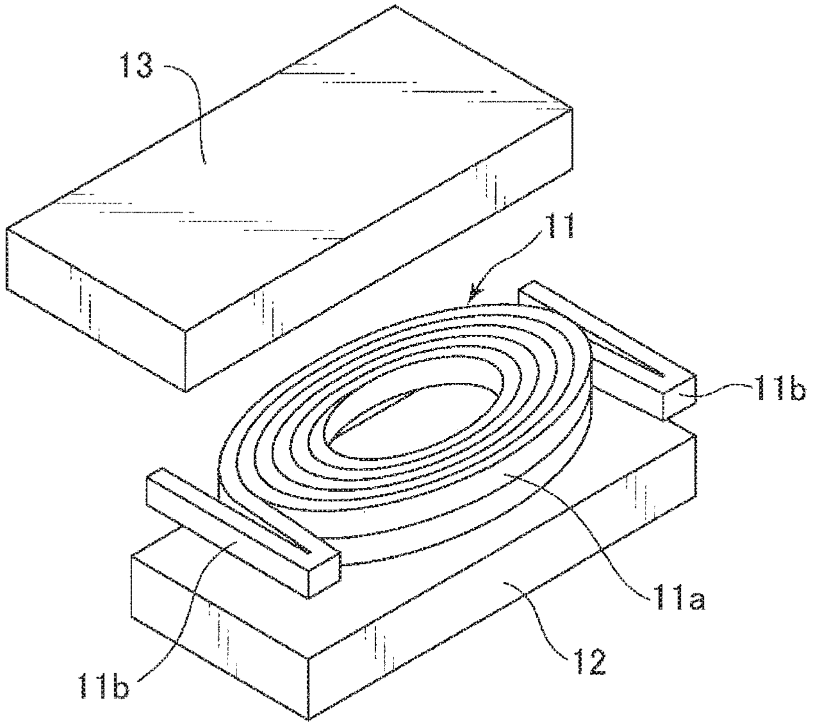
FIG. 4 is a perspective view showing the arrangement of a coil and a tablet of the embodiment of the surface mounted inductor according to the present disclosure.

As described below, in order to form a formed body incorporating an air core coil 11 having a wound portion 11*a* and lead-out ends 11*b*, plate-shaped tablets 12, 13, each having almost the same size as that of an outer periphery of the coil 11, are formed with a sealing material as shown in FIG. 4.

Figure 5:
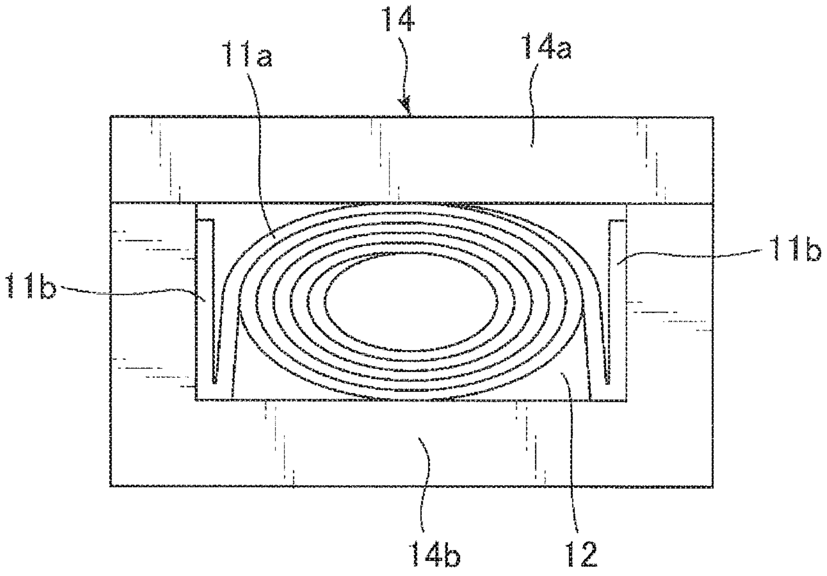
FIG. 5 is a top view showing the arrangement of the coil in a molding die and the tablet of the embodiment of the surface mounted inductor according to the present disclosure.

Next, as shown in FIG. 5, the air core coil having the wound portion 11*a* and the lead-out ends 11*b*, which is in a state of being mounted on the plate-shaped tablet 12, is housed in a cavity of a molding die formed of an upper die 14 having a sectional die 14*a* and a sectional die 14*b*, and a lower die (not shown).

Figure 6:
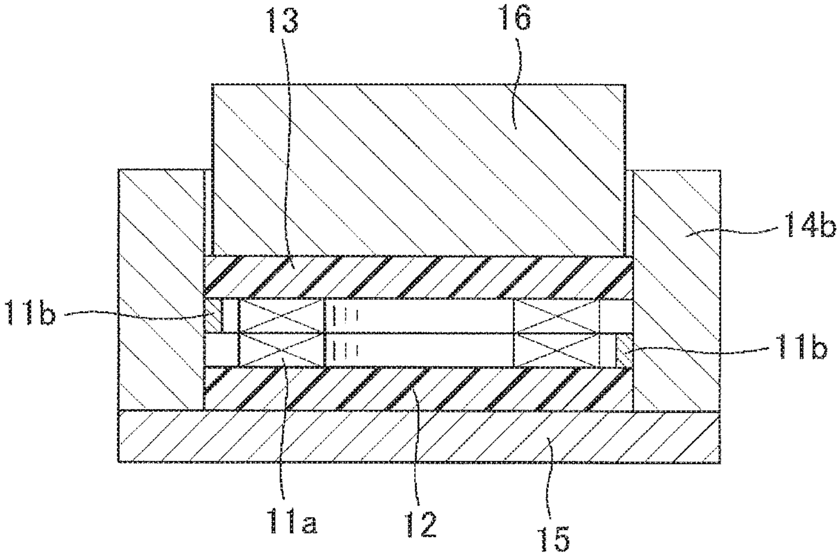
FIG. 6 is a cross-sectional view explaining the step of placing the coil and the tablet in the molding die of an embodiment a manufacturing method for a surface mounted inductor according to the present disclosure.

Subsequently, the tablet 13 is housed in the cavity of the molding die, where the air core coil having the wound portion 11*a* and the lead-out ends 11*b*, and the plate-shaped tablet 12 are housed, so as to be positioned on the air core coil. Thereby, as shown in FIG. 6, in the cavity of the molding die formed of the upper die 14 having the sectional die 14*a* and the sectional die 14*b*, and the lower die 15, the air core coil having the wound portion 11*a* and the lead-out ends 11*b* is arranged between the pair of plate-shaped tablets 12 and 13, and in this state, a punch 16 is set in the cavity of the molding die.

Figure 7:
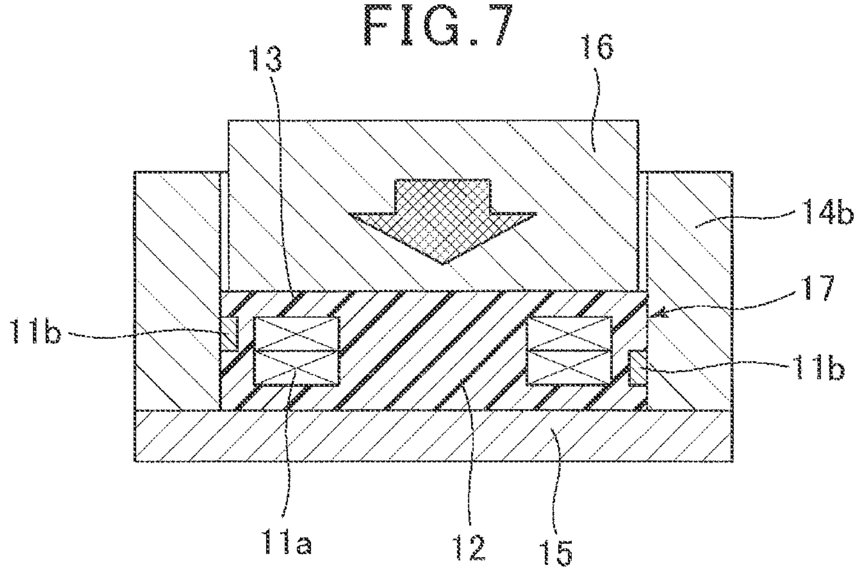
FIG. 7 is a cross-sectional view explaining the forming step of a formed body of the embodiment of the manufacturing method for a surface mounted inductor according to the present disclosure.
Figure 8:
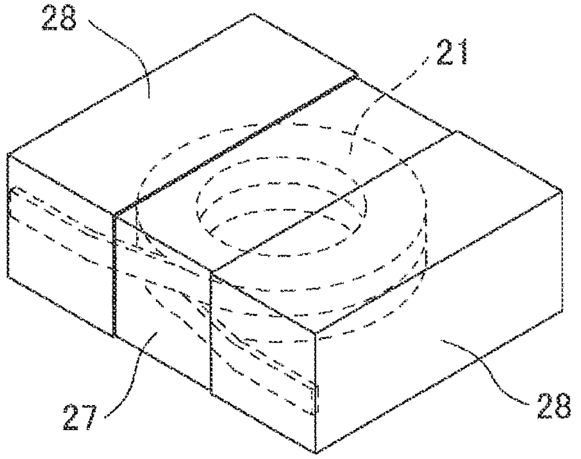
FIG. 8 is a perspective view showing the inside of a conventional surface mounted inductor when it is seen in a see-through state.
Figure 9:
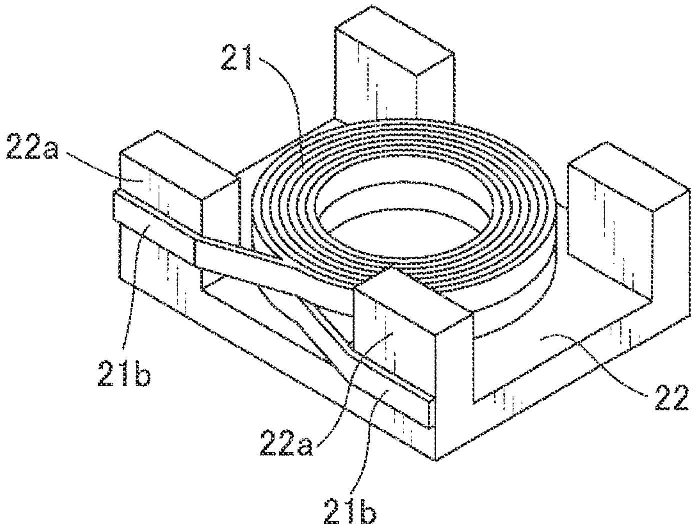
FIG. 9 is a perspective view for explaining a tablet of the conventional surface mounted inductor.
Figure 10:
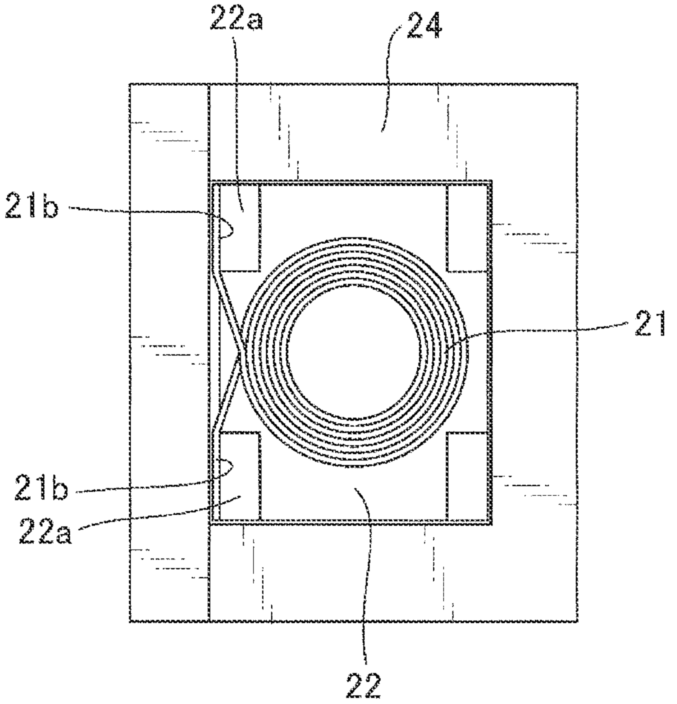
FIG. 10 is a top view showing the arrangement of a coil and a tablet in a molding die of the conventional surface mounted inductor.

Furthermore, as shown in FIG. 7, the pair of plate-shaped tablets and the air core coil are molded by the so-called compression molding method in which they are compressed with the molding die and the punch at 120-250° C., whereby a formed body 17 incorporating the air core coil 11 is formed. This formed body 17 is formed so that surfaces in the minor axis direction of the wound portion 11*a* of the coil 11 are partially exposed on side surfaces opposed in the width direction of the formed body 17, that surfaces of the lead-out ends 11*b* of the coil 11 are exposed on side surfaces opposed in the length direction of the formed body 17, and that, when the formed body is seen in a see-through state from a winding axis direction of the coil, the area of a portion of the formed body outside the outer periphery of the wound portion 11*a* of the coil 11 is almost equal to or smaller than the area of a portion of the formed body inside an inner periphery of the wound portion 11*a* of the coil 11.

Treatment for removing the insulation coating is performed, which is treatment for removing the insulation coating of the lead-out ends 11*bs* of the coil 11 exposed on the side surfaces opposed in the length direction of the formed body 17 thus obtained, and barrel polishing treatment of the formed body 17 thus obtained is performed. The treatment for removing the insulation coating and the barrel polishing treatment may also be performed at the same time.

Referring again to FIG. 3, an external terminal material containing a conductive material is coated on surfaces of this formed body 17, and cured to form external terminals 18 on the surfaces of the formed body 17. The external terminals 18 may be plated with a material selected from one or a plurality of Ni, Sn, Cu, Au, Pd and the like as necessary.

The above has described the embodiments of the surface mounted inductor and manufacturing method therefor of the present disclosure, however, the present disclosure is not limited to these embodiments. For example, as the sealing material, the iron-based magnetic powder was used for the filling material, and the epoxy resin was used for the resin. As the filling material, metal magnetic powders having other compositions, metal magnetic powder whose surface is coated with an insulator such as glass, surface-modified metal magnetic powder, ferrite powder, glass fiber and the like may also be used. As the resin, a thermoset resin such as a polyimide resin or a phenol resin, and a thermoplastic resin such as a polyethylene resin or a polyamide resin may also be used. Furthermore, the wound portion of the coil may also be formed in a circular shape. Still furthermore, the formed body formed by placing the coil on the plate-shaped tablet formed with the sealing material in the cavity of the molding die, filling the coil with a powdery sealing material, and integrating them by the compression molding method or the powder compacting method may also be formed so that the surfaces in the minor axis direction of the wound portion of the coil are partially exposed on the side surfaces opposed in the width direction of the formed body, that the surfaces of the lead-out portions of the coil are exposed on the side surfaces opposed in the length direction of the formed body, and that the area of the portion of the formed body outside the outer periphery of the wound portion of the coil is formed almost equal to or smaller than the area of the portion of the formed body inside the inner periphery of the wound portion of the coil.

The invention claimed is:

1. A manufacturing method for a surface mounted inductor including a coil formed by winding a conductive wire, and a formed body incorporating the coil, the formed body being formed with a sealing material containing a resin and a magnetic material, the manufacturing method comprising the steps of:

forming a coil by winding a conductive wire so that lead-out ends are positioned at an outer periphery of a wound portion;

forming a formed body by placing the coil between a pair of plate-shaped tablets which are formed with the sealing material, and integrating the tablets by a compression molding method so that the coil is partially exposed on four side surfaces of the formed body which are parallel to a winding axis of the coil, and the area of a portion of the formed body outside the outer periphery of the wound portion of the coil is almost the same as or smaller than the area of a portion of the formed body inside an inner periphery of the wound portion of the coil; and forming external terminals connected to the lead-out ends of the coil on surfaces of the formed body.

2. The manufacturing method for a surface mounted inductor according to claim 1, comprising, in the step of forming the coil, forming a coil having a wound portion formed in an elliptical shape by winding a conductive wire shape so that both of its ends are positioned at an outer periphery, and lead-out ends led out from the outer periphery of the wound portion, wherein a size in a minor axis direction of the wound portion and a size in a width direction of the formed body are made the same, and wherein a size in a major axis direction of the wound portion is made to have a size obtained by subtracting a size of two conductive wires from a size in a length direction of the formed body or less, and, in the step of forming the formed body, forming a formed body so that surfaces in the minor axis direction of the wound portion of the coil are exposed on two side surfaces opposed in the width direction of the formed body, and surfaces of the lead-out ends of the coil are exposed on two side surfaces opposed in the length direction of the formed body so as to connect the lead-out ends of the coil to external terminals.

* * * * *